(12) United States Patent
Frenger et al.

(10) Patent No.: US 12,335,864 B2
(45) Date of Patent: Jun. 17, 2025

(54) TRANSMISSION SYSTEM CONTROL

(71) Applicant: Telefonaktiebolaget LM Ericsson (publ), Stockholm (SE)

(72) Inventors: Pål Frenger, Linköping (SE); Richard Tano, Stockholm (SE); Erik Eriksson, Linköping (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 583 days.

(21) Appl. No.: 17/275,889

(22) PCT Filed: Sep. 14, 2018

(86) PCT No.: PCT/EP2018/074938
§ 371 (c)(1),
(2) Date: Mar. 12, 2021

(87) PCT Pub. No.: WO2020/052786
PCT Pub. Date: Mar. 19, 2020

(65) Prior Publication Data
US 2022/0046533 A1 Feb. 10, 2022

(51) Int. Cl.
*H04W 52/02* (2009.01)
(52) U.S. Cl.
CPC ... *H04W 52/0206* (2013.01); *H04W 52/0274* (2013.01)
(58) Field of Classification Search
CPC .............. H04W 52/0206; H04W 52/0274
See application file for complete search history.

(56) References Cited

U.S. PATENT DOCUMENTS

| | | | |
|---|---|---|---|
| 9,846,479 B1* | 12/2017 | Brown | G06F 1/3206 |
| 2001/0000504 A1 | 4/2001 | Ishikawa | |
| 2013/0176873 A1* | 7/2013 | Ji | H04W 76/28 455/67.11 |

(Continued)

OTHER PUBLICATIONS

International Search Report and Written Opinion dated Apr. 2, 2019 in International Application No. PCT/EP2018/074938 (8 pages total).

(Continued)

*Primary Examiner* — Muthuswamy G Manoharan
(74) *Attorney, Agent, or Firm* — Weisberg I.P. Law, P.A.

(57) ABSTRACT

A control system is configured to control a transmission system (12). The control system may be configured to, responsive to the occurrence of a condition for the transmission system (12) to exit a sleep state (12S), trigger the transmission system (12) to transition from the sleep state (12S) to an active state (12A). The control system may be further configured to control the transmission system (12) to transmit during at least a fraction of a transition period (12P) over which the transmission system (12) transitions from the sleep state (12S) to the active state (12A). Such control may for instance control the transmission system (12) to transmit, during the at least a fraction of the transition period (12P), in compliance with relaxed component performance requirements that are relaxed with respect to the component performance requirements with which the transmission system (12) is configured to transmit during the active state (12A).

13 Claims, 16 Drawing Sheets

(56) References Cited

U.S. PATENT DOCUMENTS

| | | | |
|---|---|---|---|
| 2014/0146680 A1* | 5/2014 | Wang | H04W 52/0206 |
| | | | 370/236 |
| 2017/0003525 A1* | 1/2017 | Tatsuzawa | G02F 1/13363 |
| 2017/0331577 A1* | 11/2017 | Parkvall | H04J 11/0079 |
| 2017/0367040 A1* | 12/2017 | Sakai | H04W 84/12 |

OTHER PUBLICATIONS

Gunther Auer et al., "Energy efficiency analysis of the reference systems, areas of improvements and target breakdown", EARTH (Energy Aware Radio and neTwork tecHnologies),INFSO-ICT-247733 EARTH, Deliverable D2.3, Nov. 30, 2010 (68 pages).

* cited by examiner

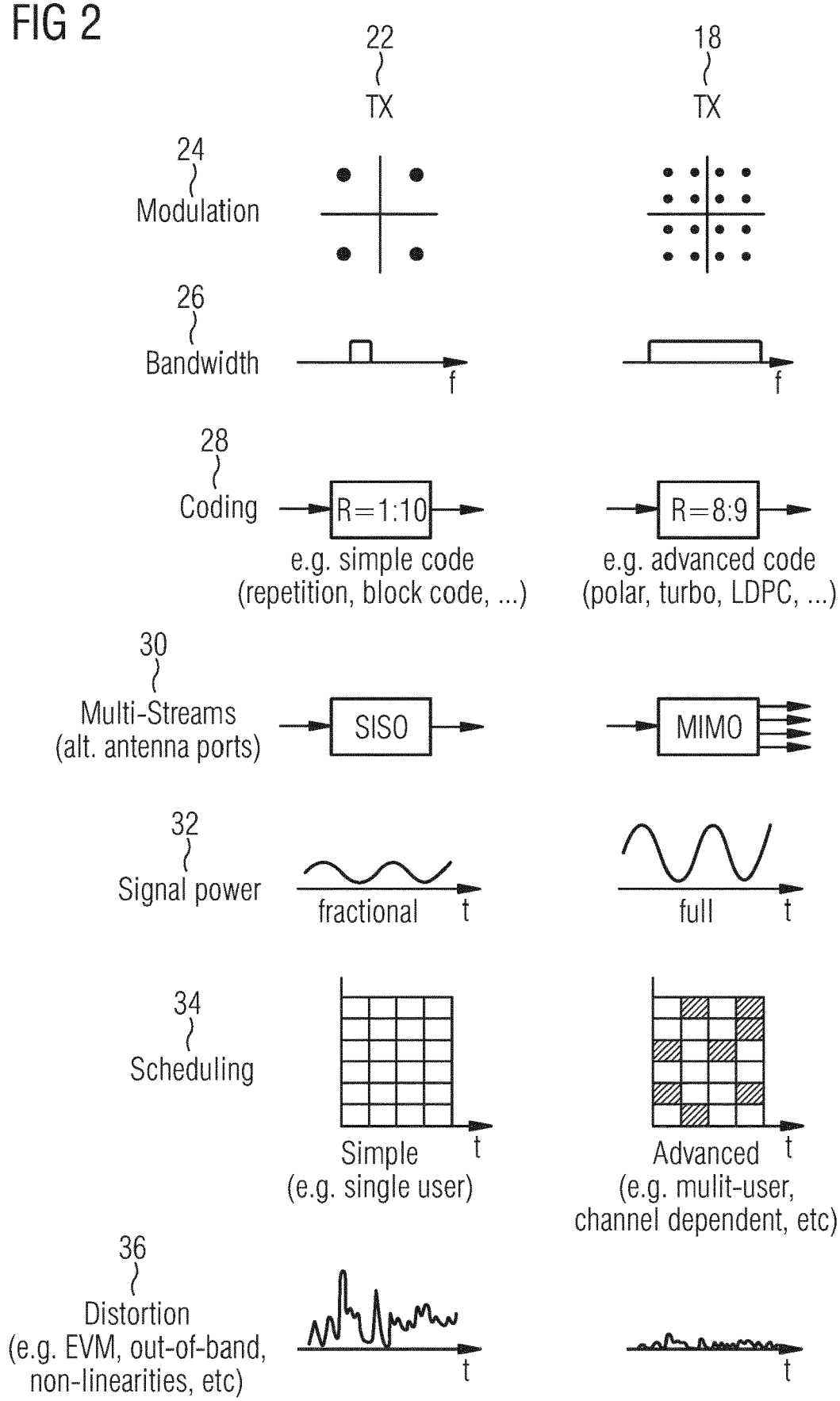

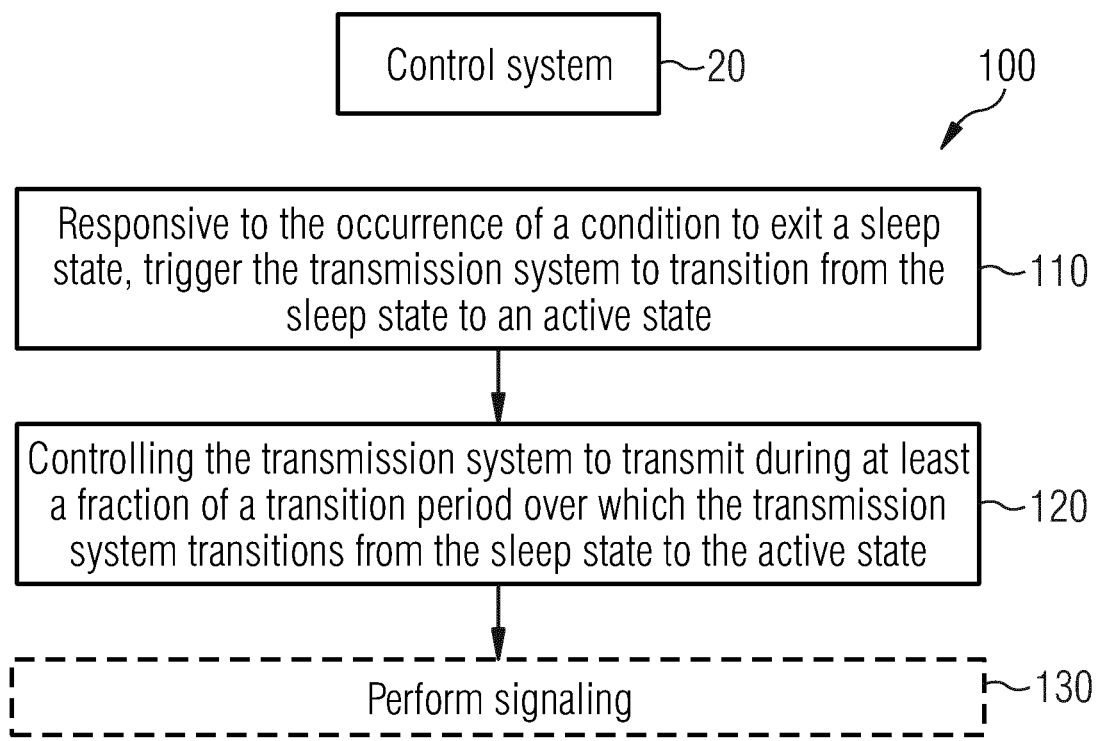

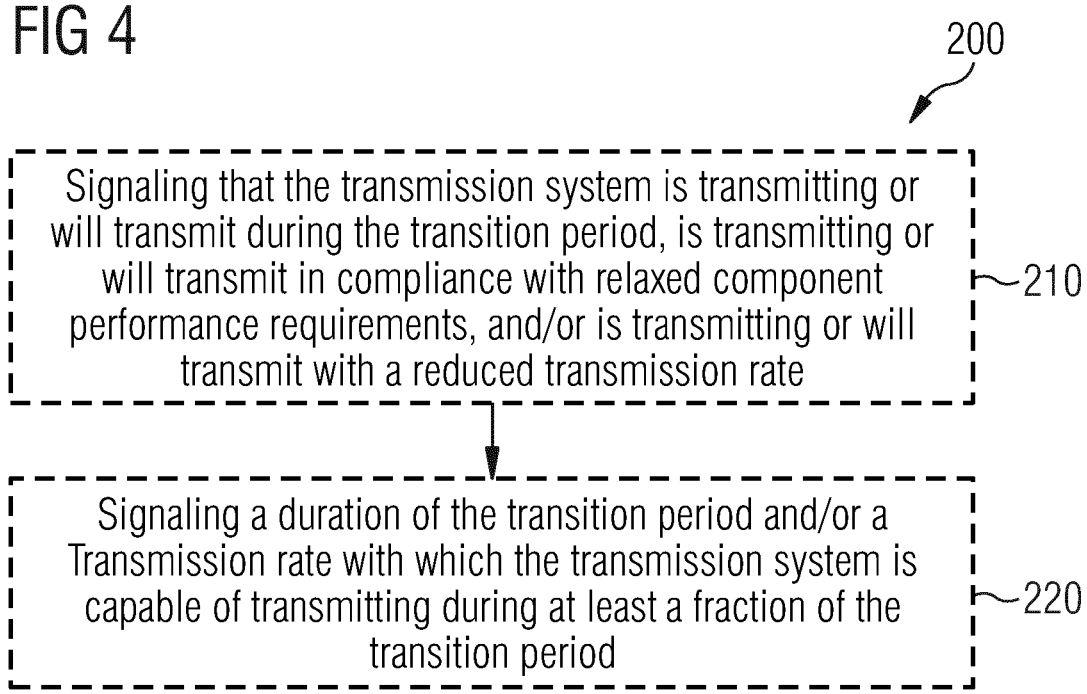
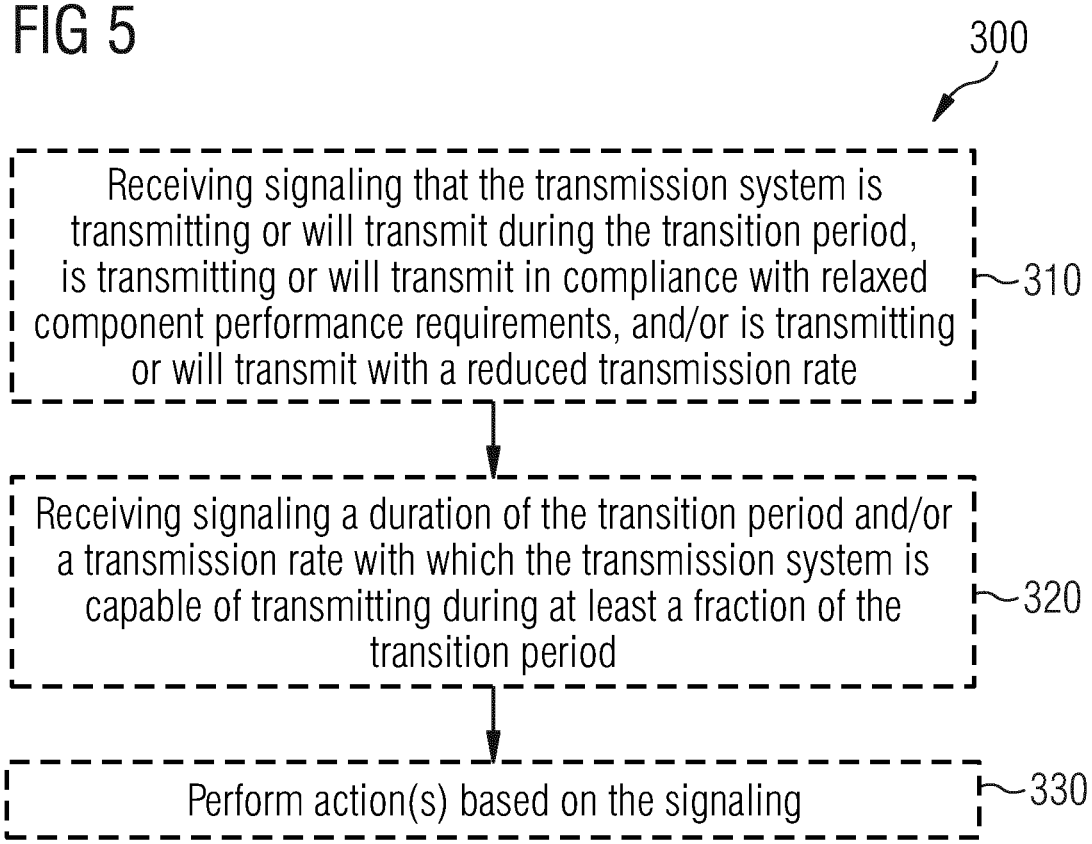

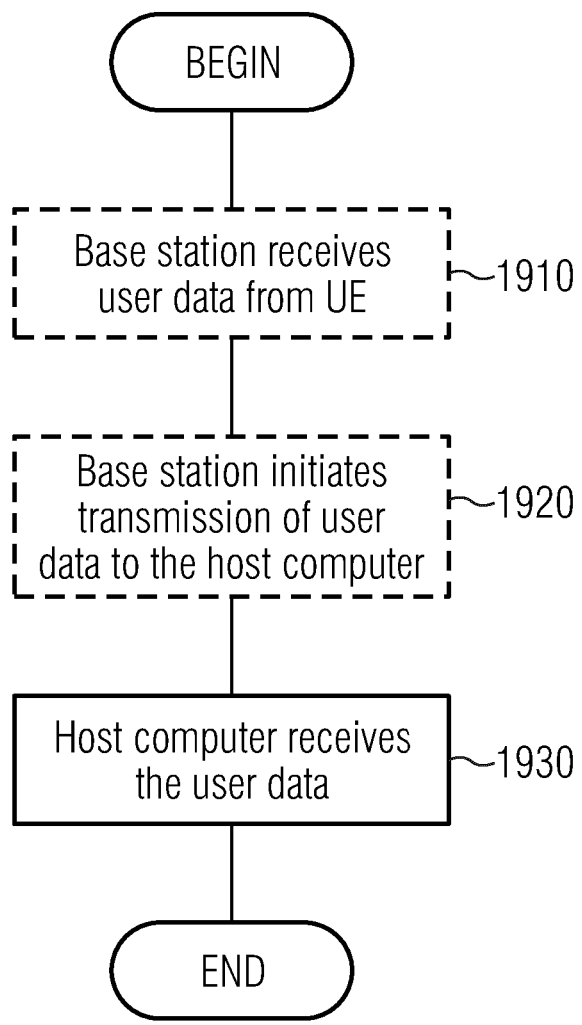

12,335,864 B2

TRANSMISSION SYSTEM CONTROL

CROSS REFERENCE TO RELATED APPLICATION(S)

This application is a 35 U.S.C. § 371 National Stage of International Patent Application No. PCT/EP2018/074938, filed Sep. 14, 2018, designating the United States.

TECHNICAL FIELD

The present application relates generally to a transmission system, and relates more particularly to control of the transmission system.

BACKGROUND

Wireless communication system operators increasingly desire to reduce the power consumption of base stations in their systems. This in turn reduces ongoing system costs as well as environmental footprint. Similarly, reducing the power consumption of wireless devices (e.g., user equipment) in the system improves battery lifetime.

One way to reduce power consumption is to configure a base station or wireless device to sleep under certain conditions. When sleeping, a base station or wireless device powers off at least some of its components (e.g., that form its transmitter circuitry and/or receiver circuitry). The conditions under which a base station or wireless device sleeps may be chosen to generally scale the power consumption with served traffic, e.g., so that the base station or wireless device consumes little power when no traffic needs to be served. For example, a base station or wireless device may be configured to sleep during certain times of the day or year when no traffic is expected (e.g., in the middle of the night). Or a base station or wireless device may be configured to sleep after a threshold level of inactivity, e.g., in terms of transmitting and/or receiving for a certain period of time.

Configuring a base station or wireless device with the most appropriate conditions for sleep nonetheless proves challenging, especially in a way that provides different levels or states of sleep. For example, configuring a base station or wireless device with a "deep" sleep state enables significant power savings, but components in such a deep sleep state can take a long time to activate and thereby delay transmission.

SUMMARY

Some embodiment herein relate to controlling a transmission system to transmit in compliance with relaxed component performance requirements, and/or with reduced capability, while transitioning from a sleep state to an active state. For example, while emerging from the sleep state, the transmission system may exploit the fact that its recently awoken components may at least meet certain relaxed or reduced requirements on a capability or performance (e.g. less strict with respect to a required capabilities or performance), in order to (be able to) transmit even before those components are ready to perform as required in the active state. The transmission system may thereby transmit earlier, albeit perhaps with reduced capability (e.g., with reduced transmission rate), than otherwise possible had the transmission system waited to transmit until completing the transition to the active state. Some embodiments accordingly reduce transmission delay and/or enable deeper sleep and correspondingly lower power consumption for a given transmission delay budget. This may prove particularly advantageous for quickly transmitting small data packets while still allowing the transmission system to enter sleep states that aggressively provide deep sleep with long activation delays back to the active state.

More particularly, embodiments herein include a method performed by a control system for controlling a transmission system according to some embodiments. The method may include, responsive to the occurrence of a condition for the transmission system to exit a sleep state, triggering the transmission system to transition from the sleep state to an active state. The sleep state may for instance be a state in which certain transmission components of the transmission system are de-activated and/or the active state may be a state in which the certain transmission components are activated. In some embodiments, the certain transmission components comply with certain component performance requirements in the active state. Alternatively or additionally, the active state may be a state in which the transmission system is capable of (e.g., supports) transmitting with a certain capability (e.g., maximum transmission rate) and/or transmission component performance (e.g., frequency accuracy, amplifier linearity, etc.).

In some embodiments, the method may further include controlling the transmission system to transmit during at least a fraction of a transition period over which the transmission system transitions from the sleep state to the active state. Such control may for instance control the transmission system to transmit, during the at least a fraction of the transition period, in compliance with relaxed component performance requirements that are relaxed with respect to the certain component performance requirements. Alternatively or additionally, such control may control the transmission system to transmit, during the at least a fraction of the transition period, with a reduced capability (e.g., reduced transmission rate) and/or transmission component performance (e.g., reduced frequency accuracy, reduced amplifier linearity, etc.). that is reduced compared to the certain capability and/or transmission component performance.

In some embodiments, the method may further comprise performing signaling related to the above described control. For example, in some embodiments, the method comprises signaling (e.g., either explicitly or implicitly) that the transmission system is transmitting or will transmit during the transition period over which the transmission system transitions from the sleep state to the active state, is transmitting or will transmit in compliance with relaxed component performance requirements, and/or is transmitting or will transmit with a reduced transmission rate that is reduced compared to a transmission rate with which the transmission system is capable of transmitting in the active state. Alternatively or additionally, the method may comprise signaling a duration of the transition period and/or a transmission rate with which the transmission system is capable of transmitting during at least a fraction of the transition period.

In some embodiments, the control described above comprises controlling the transmission system to transmit, during at least a fraction of the transition period, up to a reduced maximum transmission rate that is reduced compared to a maximum transmission rate up to which the transmission system is capable of transmitting in the active state.

Alternatively or additionally, such control may comprise controlling the transmission system to transmit, during at least a fraction of the transition period, with a reduced capability that is reduced compared to a corresponding capability with which the transmission system is capable of transmitting in the active state. In this case, the reduced capability may comprise one or more of a reduced maximum transmission power, a reduced maximum modulation order, a reduced maximum channel coding rate, a reduced maximum frequency bandwidth, a reduced maximum number of transmission streams, a reduced maximum number of component carriers, or a reduced maximum number of served users.

In any of these embodiments, the certain transmission components may include one or more analog transmission components. In one embodiment, for instance, the certain transmission components include an oscillator, the certain component performance requirements include a frequency error requirement of the oscillator, and the relaxed component performance requirements include a relaxed frequency error requirement that permits the oscillator to have larger frequency error than the frequency error requirement. In another embodiment, the certain transmission components include a power amplifier, the certain component performance requirements include a linearity requirement of the power amplifier, and the relaxed component performance requirements include a relaxed linearity requirement that permits the power amplifier to be less linear than the linearity requirement.

In some embodiments, the method is performed by a wireless device that includes the transmission system. In one such embodiment, the method may further comprise receiving multiple different uplink grants for use by the wireless device in transmitting at different respective transmission rates. In this case, controlling may comprise selecting from among the multiple different uplink grants the uplink grant that corresponds to a transmission rate with which the transmission system transmits during at least a fraction of the transmission period.

In other embodiments, the method is performed by a radio network node that includes the transmission system.

In still other embodiments, the transmission components comprise multiple distributed radio network nodes or multiple distributed antenna elements.

Embodiments herein also include corresponding apparatus, computer programs, and carriers (e.g., non-transitory computer-readable mediums). For example, embodiments herein include a control system for controlling a transmission system. The control system may be configured (e.g., via processing circuitry and/or communication circuitry) to, responsive to the occurrence of a condition for the transmission system to exit a sleep state, trigger the transmission system to transition from the sleep state to an active state. The sleep state may for instance be a state in which certain transmission components of the transmission system are de-activated and/or the active state may be a state in which the certain transmission components are activated. In some embodiments, the certain transmission components comply with certain component performance requirements in the active state. Alternatively or additionally, the active state may be a state in which the transmission system is capable of (e.g., supports) transmitting with a certain capability (e.g., transmission rate) and/or transmission component performance (e.g., frequency accuracy, amplifier linearity, etc.).

In some embodiments, the control system may be further configured (e.g., via processing circuitry and/or communication circuitry) to control the transmission system to transmit during at least a fraction of a transition period over which the transmission system transitions from the sleep state to the active state. Such control may for instance control the transmission system to transmit, during the at least a fraction of the transition period, in compliance with relaxed component performance requirements that are relaxed with respect to the certain component performance requirements. Alternatively or additionally, such control may control the transmission system to transmit, during the at least a fraction of the transition period, with a reduced capability (e.g., reduced transmission rate) and/or transmission component performance (e.g., reduced frequency accuracy, reduced amplifier linearity, etc.). that is reduced compared to the certain capability and/or transmission component performance.

BRIEF DESCRIPTION OF THE DRAWINGS

FIG. 2 is block diagram of different possible parameters for a transmission performed during at least a fraction of a transition period from a sleep state to an active state, according to some embodiments.

FIG. 3 is a logic flow diagram of a method performed by a control system according to some embodiments.

FIG. 4 is a logic flow diagram of a method performed by a control system and/or a transmission system according to other embodiments.

FIG. 5 is a logic flow diagram of a method performed by a receiver according to some embodiments.

FIG. 19 is a flowchart illustrating a method implemented in a communication system, in accordance with one embodiment.

DETAILED DESCRIPTION

Figure 1:
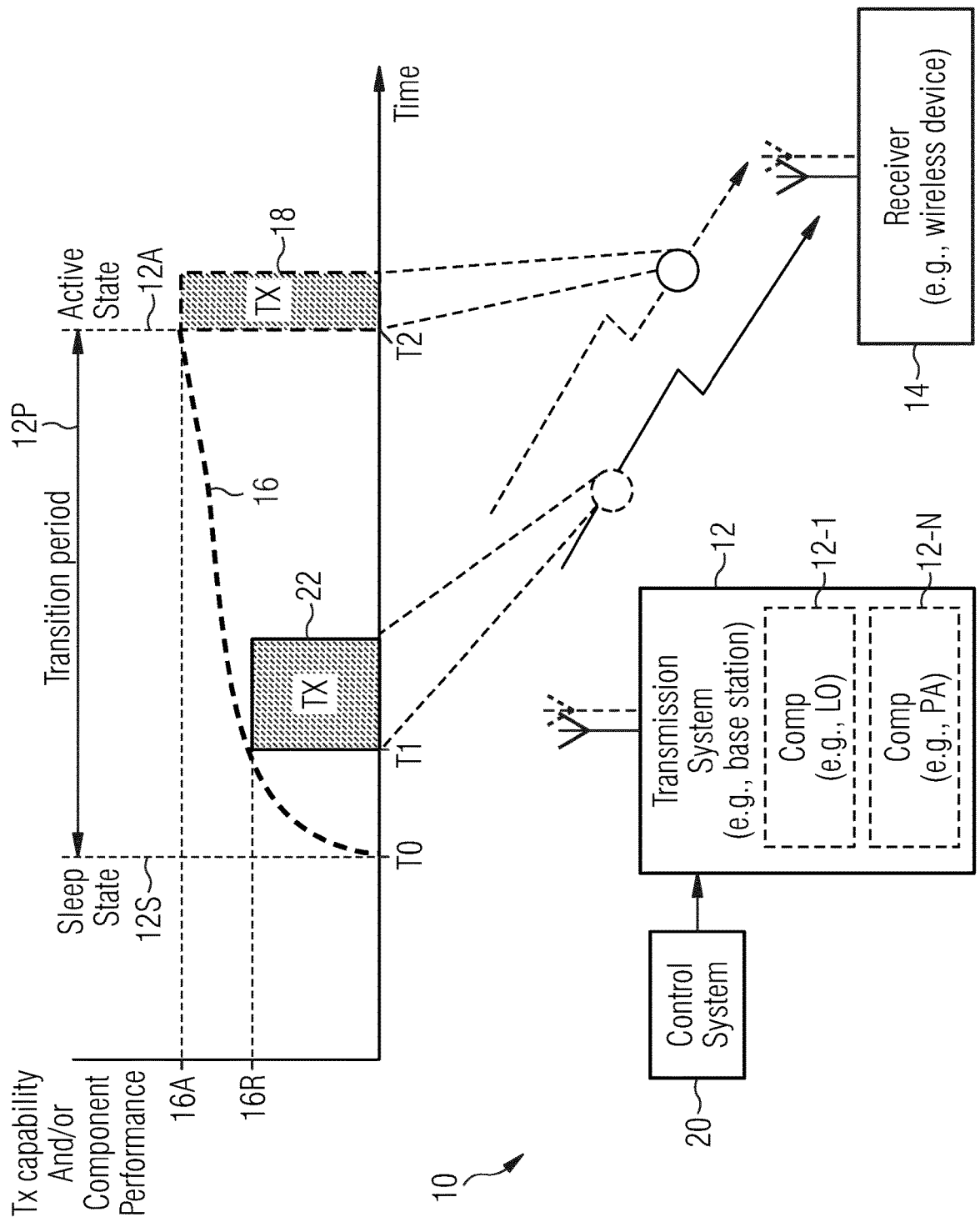
FIG. 1 is a block diagram of a wireless communication system that includes a control system and transmission system according to some embodiments.

FIG. 1 shows a communication system 10 according to some embodiments. The system 10 includes a transmission system 12 that is configured to transmit to a receiver 14, e.g., over a radio interface. In some embodiments for example where the communication system 10 is a wireless communication system, the transmission system 12 may be or be included in a radio network node (e.g., a base station) and the receiver 14 may be or be included in a wireless device (e.g., a user equipment). Alternatively, the transmission system 12 may be or be included in a wireless device and the receiver 14 may be or be included in a radio network node.

The transmission system 12 supports operating in one or more sleep states, e.g., responsive to the occurrence of a condition suggesting that sleep will not jeopardize any anticipated transmission needs. In each sleep state, the transmission system 12 deactivates at least some of its transmission components, e.g., that are associated with certain transmission functions. FIG. 1 for instance shows that the transmission system 12 may deactivate one or more transmission components 12-1 ... 12-N, which may include a local oscillator (LO), a power amplifier (PA), or other analog components. This deactivation may conserve power. Where multiple sleep states are supported, the different sleep states may provide different degrees of sleep and corresponding power conservation. For example, in different sleep states, the transmission system 12 may deactivate a different number of transmission components and/or may deactivate transmission components to different degrees.

No matter the particular sleep state, though, the transmission system 12 may exit that sleep state in favor of an active state responsive to the occurrence of a certain condition, such as the arrival of data in a transmit buffer, suggesting that a transmission is or will be needed. Entering the active state may involve for instance activating analog components (e.g., filters, oscillators, pre-driver and main-driver amplification stages, mixers, etc.), digital components (e.g., processor cores, memories, fast Fourier transform calculation units, etc.), and/or other components (e.g., clocks, buffers, etc.). Regardless, in this active state, the transmission system 12 may be capable of transmitting with a certain capability (e.g., a certain maximum transmission rate) and/or certain component performance (e.g., oscillator frequency accuracy, power amplifier linearity, etc.).

However, the transition from a sleep state to the active state does not occur instantly. Instead, the transition occurs over time, meaning that there is some delay between when exit from a sleep state is triggered and when the active state is reached. FIG. 1, for instance, shows that exit from a sleep state 12S is triggered at time T0 but the transmission system 12 does not reach the active state 12A until time T2, after a transition period 12P. Indeed, it is only after this transition period 12P that the transmission system's transmission (TX) capability and/or transmission component performance 16 reaches a certain level 16A required by and/or otherwise associated with the active state 12A.

Generally, the length of the transition period 12P depends on how light or deep of sleep the sleep state 12S provides, e.g., a deeper sleep state deactivates a greater number of transmission components or deactivates transmission components to a greater degree and thereby requires a longer transition period 12P. Especially for deeper sleep states, then, the transition period 12P introduces a non-negligible delay until when the transmission system 12 can perform a transmission 18 in the active state 12A with a certain level 16A of transmission capability and/or transmission component performance. This delay would heretofore jeopardize the ability of the transmission system 12 to meet requirements on a quality of service to be provided by the transmission system 12, including for instance data latency requirements, or preclude the transmission system 12 from entering the sleep state 12S to begin with.

According to some embodiments herein, a control system 20 controls the transmission system 12 to transmit even while the transmission system 12 transitions from the sleep state 12S to the active state 12A, during the transition period 12P. The control system 20 in this regard exploits the transmission system's ability to transmit during the transition period 12P, albeit with reduced transmission capability and/or transmission component performance 16.

FIG. 1 for example generally shows that the system's transmission capability and/or transmission component performance 16 gradually improves over the course of the transition period 12P, rather than instantly reaching the certain level 16A required by the active state 12A at the end of the transition period 12P. This gradual improvement may be for instance attributable at least in part to the transmission system's analog components (e.g., local oscillator, pre-driver and main-driver power amplifier, filters, mixers, etc.) gradually stabilizing after they are activated until their performance reaches a level 16A required for transmission in the active state 12A. When an oscillator of the transmission system 12 is activated out of the sleep state 12S, for instance, the oscillator may initially have poor frequency accuracy (i.e., large frequency error) directly after activation, but that frequency accuracy may gradually improve over the course of the transition period 12P. Similarly, when a power amplifier of the transmission system 12 is activated out of the sleep state 12S, the amplifier may initially have poor linearity (i.e., large non-linearity errors) directly after activation, but that linearity may gradually improve over the course of the transition period 12P.

No matter the particular reason for this gradual improvement, the control system 20 capitalizes on the system's transmission capability and/or transmission component performance 16 reaching at least a level 16R that is reduced compared to the active state level 16A, in order to perform a transmission 22 even during at least a portion or fraction of the transition period 12P. The control system 20 may for instance monitor for when the transmission system's transmission capability and/or transmission component performance 16 reaches this reduced level 16R required for transmission during the transition period 12P and control the transmission system 12 to transmit when that occurs. The transmission system 12 may thereby transmit earlier (e.g., at time T1), with tolerance for reduced capability (e.g., reduced transmission rate) and/or relaxed component performance, than otherwise possible had the transmission system 12 waited to transmit until completing the transition to the active state 12A at time T2. As an example, transmission 22 during the transition period 12P at time T1 may start 1 to 10 ms after triggering exit of the sleep state 12S at time T0, whereas transmission 18 in the active state 12A at time T2 may have started 10 to 1000 ms after triggering exit of the sleep state 12S at time T0.

Some embodiments accordingly reduce transmission delay and/or enable deeper sleep and correspondingly lower power consumption for a given transmission delay budget. This may prove particularly advantageous for quickly transmitting small data packets while still allowing the transmission system 12 to enter sleep states that aggressively provide deep sleep with long activation delays back to the active state 12A. Some embodiments as a result extend battery life where the transmission system 12 is a wireless device or reduce costs and/or environmental footprint where the transmission system 12 is a radio network node, while at the same time meeting quality of service requirements (e.g., in terms of packet latency).

Note that, in some embodiments, transmission 22 during at least a fraction of the transition period 12P may obviate the need for any transmission 18 in the active state 12A. This may be the case for instance if the amount of data needing to be transmitted is small. In these and other cases, then, the control system 20 in some embodiments may cancel or halt the transition to the active state 12A and, after performing the transmission 22 during the transition period 12P, return back to the same or a different sleep state.

In other embodiments, though, the transmission 22 during at least a fraction of the transition period 12P may supplement any transmission 18 in the active state 12A. This may be the case for instance if more data than can be transmitted in the transition period 12P needs to be transmitted. In these and other embodiments, the transmission system 12 may continue to transition to the active state 12A during and/or after performance of the transmission 22 in the transition period 12P, e.g., as a sort of background transition process.

Note further that, in some embodiments, the transmission system 12 may consider itself as having multiple different active states that offer different levels of transmission capabilities and/or transmission component performances. For example, the active state 12A in FIG. 1 may be considered a full capability active state associated with a relatively higher level 16A of transmission capability and/or transmission component performance 16. A reduced capability active state may in turn be associated with a relatively lower level 16R of transmission capability and/or transmission component performance 16. The transmission system 12 in this case may operate in the reduced capability active state during at least a fraction of the transition period 12P in which the transmission system 12 is transitioning to the full capability active state 12A. In these and other embodiments, then, the design of the transmission system's sleep state(s) may account for the duration of a transition period to the reduced capability active state (e.g., T1-T0 in FIG. 1). In this case, the sleep state(s) may group components with similar activation delay to be de-activated.

No matter whether the transmission 22 during the transition period 12P is considered as being performed within a reduced capability active state, the transmission system 12 may perform the transmission 22 with reduced transmission capability (e.g., a reduced maximum transmission rate) and/or transmission component performance 16 in any number of ways. FIG. 2 shows a few examples in this regard.

As shown in FIG. 2, the transmission 22 during the transition period 12P may be performed with modulation 24 that has a lower maximum order than that of the transmission 18 performed in the active state 12A. Alternatively or additionally, the transmission 22 during the transition period 12P may be performed with a maximum frequency bandwidth 26 that is smaller than that of the transmission 18 performed in the active state 12A. In other embodiments, the transmission 22 during the transition period 12P may alternatively or additionally be performed with channel coding 28 that has a lower maximum coding rate or is otherwise simpler than that of the transmission 18 performed in the active state 12A. In still other embodiments, the transmission 22 during the transition period 12P may be performed with a smaller maximum number of transmission streams (in the spatial domain) than that of the transmission 18 performed in the active state 12A. In yet other embodiments, the transmission 22 during the transition period 12P may be performed with maximum signal power 34 that is fractional of and/or otherwise lower than that of the transmission 18 performed in the active state 12A. Indeed, any of these transmission parameters, be it maximum modulation order, maximum frequency bandwidth, maximum channel coding rate, maximum number of streams, and maximum signal power, may be reduced for transmission 22 during the transition period 12P and may contribute to reduced capability (e.g., reduced maximum transmission rate) during that period 12P.

Note that in the above described embodiments, the transmission parameters in FIG. 2 represent maximums supported for transmission 22 and transmission 18. More particularly, then, it is the maximum modulator order, maximum frequency bandwidth, maximum coding rate, maximum number of streams, and/or maximum signal power supported for transmission 22 during the transition period 12P that is reduced compared to that supported for transmission 18 in the active state 12A. Accordingly, the actual modulation order, actual frequency bandwidth, actual coding rate, actual number of streams, and/or actual signal power of transmission 22 and/or of transmission 18 may be less than these maximums, e.g., depending on channel conditions.

FIG. 2 also shows other embodiments where the transmission capability during the transition period 12P may be reduced due to reduced complexity of transmission scheduling 34 during that transmission period 12P. In this example shown, reduced scheduling complexity may take the form of single-user scheduling in the transition period 12P, contrasted with multi-user and/or channel dependent scheduling in the active state 12A.

In some embodiments, the transmission system 12 enforces the reduction in modulation order, frequency bandwidth, channel coding rate, number of streams, signal power, scheduling complexity, or other transmission parameter values by limiting which values of a transmission parameter are selectable for use during the transition period 12P. Of course, the reason the reduction may be needed during the transition period 12P may be because of reduced transmission component performance in the transition period 12P. That is, it may be the reduced transmission component performance (e.g., oscillator frequency error, amplifier linearity, etc.) that fundamentally limits the ability of the transmission system 12 to support certain transmission capabilities (e.g., higher modulation order, larger frequency bandwidth, tec.). In other embodiments, then, the transmission system 12 may limit which transmission component settings and/or configurations (e.g., power amplifier level, out-of-band emission level, etc.) may be used during the transition period 12P. The transmission system 12 in this way may ensure transmission during the transition period 12P complies with certain component performance requirements that are relaxed with respect to those associated with the active state 12A. FIG. 2 for instance shows that the transmission 22 during the transition period 12P may be performed with distortion 36 (e.g., error vector magnitude (EVM), out-of-band emissions, non-linearities, etc.) that complies with component performance requirements that are relaxed compared to those with which the transmission 18 in the active state 12A complies.

In some embodiments, the transmission system 12 autonomously decides whether or not to transmit with reduced capability and/or reduced component performance during the transition period 12P. For example, the transmission system 12 may autonomously decide this under circumstances where the transmission system 12 has autonomy on when to initiate a transmission (e.g., during the transition period 12P or once the active state 12A is reached) and/or on how to perform the transmission (e.g., which transmit format to use). Where the transmission system 12 is a wireless device, for instance, the wireless device may have autonomy on when to initiate and/or how to perform certain uplink transmissions (e.g., for random access). Alternatively or additionally, where the transmission system 12 is a wireless device, the wireless device may be provided with different uplink transmission grants for use in respectively transmitting with reduced capability (e.g. low rate) during the transition period 12P or with full capability (e.g., high rate) in the active state 12A. This way, if the wireless device enters a deep sleep with a long transition period 12P, and a high priority packet arrives that requires low latency not compatible with the long transition period 12P back to the active state 12A, the wireless device may decide to use the reduced capability transmission grant to start the transmission as soon as the requirements for reduced capability are met (e.g., at time T1 in FIG. 1).

In some embodiments, the transmission system 12 may transmit control signaling that indicates to the recipient of its transmission 18 or 22 whether or not the transmission 18 or 22 is or will be performed with reduced transmission capability and/or transmission component performance 16. The transmission system 12 may for instance attach a pre-amble to the transmission 18 or 22 (e.g., with a pre-defined fixed or delay-dependent format) informing the recipient on a selected transmission format of the transmission 18 or 22. Alternatively or additionally, the control signaling may be included in downlink control information (e.g., where the transmission system 12 is a radio network node), some other physical layer signaling, or using a higher layer control element.

In still other embodiments, the transmission system 12 may implicitly signal this information to the recipient, e.g., through its choice of which transmission resources (e.g., in time or frequency) to use for the transmission 18 or 22. For example, in some embodiments, different bandwidth parts (BWPs) are associated with different respective transmission capabilities and/or transmission component performances. In this case, the transmission system 12 may implicitly signaling the transmission capability and/or transmission component performance with which a transmission 18 or 22 is performed by performing the transmission 18 or 22 on a BWP mapped or otherwise corresponding to that capability and/or performance. As another example, different time-domain resources may be associated with different respective transmission capabilities and/or transmission component performances. In this case, the transmission system 12 may implicitly signaling the transmission capability and/or transmission component performance with which a transmission 18 or 22 is performed by performing the transmission 18 or 22 within certain time-domain resources mapped or otherwise corresponding to that capability and/or performance.

In some embodiments, the recipient of the explicit or implicit control signaling, indicating whether a transmission 18 or 22 is or will be performed with reduced transmission capability and/or transmission component performance 16, to prepare for that transmission or to attempt to alter how the transmission will be performed. For example, if the control signaling indicates that a transmission will be performed with reduced transmission capability and/or transmission component performance 16, the recipient (e.g., a wireless device) may request that the transmission instead be performed with full transmission capability and/or transmission component performance 16 (e.g., in case the transmission relates to a service that requires a certain capability and/or performance). This example may be particularly appropriate for embodiment where service initialization happens in the recipient, such that the recipient is the first to discover what requirements future transmissions will have (e.g., based on knowledge that traffic volume will ramp up rapidly in the near future).

In still other embodiments, the transmission system 12 may transmit control signaling, to a different node than the recipient of the transmission 18 or 22, indicating whether or not the transmission 18 or 22 is or will be performed with reduced transmission capability and/or transmission component performance 16. For example, where the transmission system 12 is or is included in a target radio network node that is or will be the target of a handover of the recipient in the form of a wireless device, the transmission system 12 may transmit the control signaling to the source radio network node of the handover. This may indicate to the source radio network node with what transmission capability and/or transmission component performance the target radio network node will or would perform the transmission 18 or 22 to the recipient upon handover. In case the indicated capability and/or performance is insufficient for a given service with which the transmission relates, the source radio network node may request that the target radio network node transition to the active state prior to executing the handover, so that the target radio network node will be able to transmit with full capability and/or performance upon handover.

Control signaling between radio network nodes may alternatively or additionally indicate the current sleep state of a radio network node and/or a mapping of sleep states (or wake-up delay durations) with achievable transmission rates. In other words, the signaling may indicate a duration of a transition period for a certain sleep state and/or a transmission rate with which the radio network node is capable of transmitting during at least a fraction of the transition period. The signaling may indicate this information for a certain wireless device being served or may indicate this information generically for the radio network node or a cell served by the radio network node. The signaling may be implemented for instance in the form of an index into a predefined table of sleep states (or wake-up delay durations) and achievable transmission rates. The control signaling may be used by the recipient radio network node in a similar way as that described above (e.g., to predict or otherwise determine the expected transmission rate immediately after a handover and request that the target radio network node transition to the active state prior to executing the handover).

Note that while the above embodiments have exemplified the transmission system 12 as being or as being included in a radio network node or a wireless device, in other embodiments the transmission system 12 comprises or is formed from multiple distributed radio network nodes, antenna elements, carriers, or radio access technologies (RATs). In this case, the transmission components of the transmission system 12 may be the individual radio network nodes or antenna elements. One or more of these components may be deactivated while the transmission system 12 is in a sleep state. The notion of full or reduced capability and/or component performance may be from a multi-node, multi-element, multi-carrier, or multi-RAT perspective. A wireless device may for instance communicate with one set of radio network nodes or antenna elements in an active state but communicate with another set of radio network nodes or antenna elements during the transition period 12P. From a network perspective, the time to active different capabilities may differ between different nodes. It may for instance be faster to provide high transmission rates by activating wide bandwidth in an active macro base station than to activate a sleeping micro node. A transmission system 12 with wide bandwidth activated in a macro node while the micro node is sleeping or transitioning out of sleep may be transmitting during the transition period 12P or in a reduced capability active state, whereas the system 12 may be transmitting in an active state or full capability active state when the micro node is active.

Although the condition for triggering the transmission system 12 to transition from a sleep state to an active state is discussed above in some examples as being the arrival of data in a transmit buffer of the transmission system 12, such triggering may be responsive to any condition, criteria, or event, e.g., that suggests the transmission system 12 is or will be needed to transmit. In some embodiments, for example, active mode transition is triggered responsive to the setup, release, and/or activity of any sort of bearer, service, flow, data stream, connection, session etc. that is associated with or indicative of quality of service (QoS) requirements imposed on the transmission system 12. In still other embodiments, active mode transition is triggered responsive to mobility events (e.g., handover and/or cell reselection) associated with wireless devices served by the transmission system 12. Indeed, such mobility events inherently affect QoS requirements imposed on the transmission system 12, e.g., as the mobility of served wireless devices changes which bearers, if any, are set up at the transmission system 12.

In view of the above modifications and variations, FIG. 3 illustrates a method 100 performed by a control system 20 for controlling a transmission system 12 according to some embodiments. The method 100 as shown includes, responsive to the occurrence of a condition for the transmission system 12 to exit a sleep state 12S, triggering the transmission system 12 to transition from the sleep state 12S to an active state 12A (Block 110). The sleep state 12S may for instance be a state in which certain transmission components 12-1 . . . 12-N of the transmission system 12 are de-activated and/or the active state 12A may be a state in which the certain transmission components 12-1 . . . 12-N are activated. In some embodiments, the certain transmission components 12-1 . . . 12-N comply with certain component performance requirements in the active state 12A. Alternatively or additionally, the active state 12A may be a state in which the transmission system 12 is capable of (e.g., supports) transmitting with a certain capability (e.g., maximum transmission rate) and/or transmission component performance (e.g., frequency accuracy, amplifier linearity, etc.).

FIG. 3 also shows that the method 100 includes controlling the transmission system 12 to transmit during at least a fraction of a transition period 12P over which the transmission system 12 transitions from the sleep state 12S to the active state 12A. Such control may for instance control the transmission system 12 to transmit, during the at least a fraction of the transition period 12P, in compliance with relaxed component performance requirements that are relaxed with respect to the certain component performance requirements. Alternatively or additionally, such control may control the transmission system 12 to transmit, during the at least a fraction of the transition period 12P, with a reduced capability (e.g., reduced maximum transmission rate) and/or transmission component performance (e.g., reduced frequency accuracy, reduced amplifier linearity, etc.). that is reduced compared to the certain capability and/or transmission component performance.

In some embodiments, as FIG. 3 shows, the method 100 may further comprise performing signaling related to the above described control (Block 130). For example, in some embodiments, the method comprises signaling (e.g., either explicitly or implicitly) that the transmission system 12 is transmitting or will transmit during the transition period 12P over which the transmission system 12 transitions from the sleep state 12S to the active state 12A, is transmitting or will transmit in compliance with relaxed component performance requirements, and/or is transmitting or will transmit with a reduced transmission rate that is reduced compared to a transmission rate with which the transmission system 12 is capable of transmitting in the active state 12A. Alternatively or additionally, the method may comprise signaling a duration of the transition period 12P and/or a transmission rate with which the transmission system 12 is capable of transmitting during at least a fraction of the transition period 12P.

FIG. 4 illustrates another method 200 performed by the control system 12 and/or the transmission system 12 according to other embodiments that may be implemented in combination with or independently of the method 100 in FIG. 3. As shown, the method 200 comprises signaling (e.g., either explicitly or implicitly) that the transmission system 12 is transmitting or will transmit during the transition period 12P over which the transmission system 12 transitions from the sleep state 12S to the active state 12A, is transmitting or will transmit in compliance with relaxed component performance requirements, and/or is transmitting or will transmit with a reduced transmission rate that is reduced compared to a transmission rate with which the transmission system 12 is capable of transmitting in the active state 12A (Block 210). Alternatively or additionally, the method may comprise signaling a duration of the transition period 12P and/or a transmission rate with which the transmission system 12 is capable of transmitting during at least a fraction of the transition period 12P (Block 220).

FIG. 5 illustrates a corresponding method 300 performed by a receiver of the above-described signaling, which may be the same or different from a receiver of the transmission from the transmission system 12. As shown, the method 300 includes receiving signaling (e.g., either explicitly or implicitly) that the transmission system 12 is transmitting or will transmit during the transition period 12P over which the transmission system 12 transitions from the sleep state 12S to the active state 12A, is transmitting or will transmit in compliance with relaxed component performance requirements, and/or is transmitting or will transmit with a reduced transmission rate that is reduced compared to a transmission rate with which the transmission system 12 is capable of transmitting in the active state 12A (Block 310). Alternatively or additionally, the method may comprise receiving signaling a duration of the transition period 12P and/or a transmission rate with which the transmission system 12 is capable of transmitting during at least a fraction of the transition period 12P (Block 320). The method 300 may further include performing one or more actions based on the received signaling (Block 330). For example, in some embodiments where the signaling is transmitted from a prospective target radio access node to a source radio network node, the source radio network node may predict or otherwise determine the expected transmission rate immediately after a handover and request that the target radio network node transition to the active state prior to executing the handover.

Note that the control system 20 herein may be implemented by any network node or equipment in the system 10. In some embodiments, the control system 20 is integrated with or co-located with the transmission system 12 (e.g., located in the same node or device as the transmission system 12). In other embodiments, the control system 20 is separated from or located away from the transmission system 12 (e.g., in a different radio network node than the transmission system 20). The control system 20 may perform the methods herein and any other processing by implementing any functional means, modules, units, or circuitry. In one embodiment, for example, the control system 20 comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
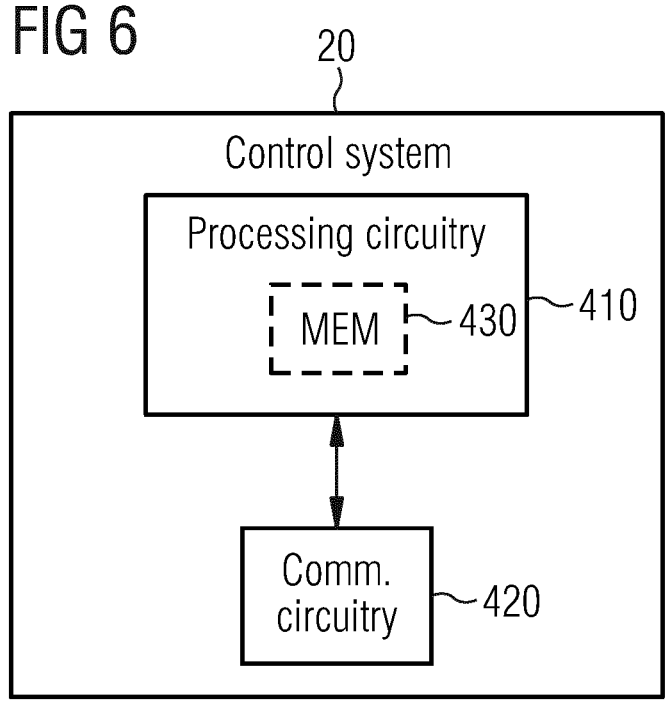
FIG. 6 is a block diagram of a control system according to some embodiments.

FIG. 6 for example illustrates the control system 20 in accordance with one or more embodiments. As shown, the control system 20 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the control system 20. The processing circuitry 410 is configured to perform processing described above (e.g., in FIGS. 3 and/or 4), such as by executing instructions stored in memory 430. The processing circuitry 410 in this regard may implement certain functional means, units, or modules.

Figure 7:
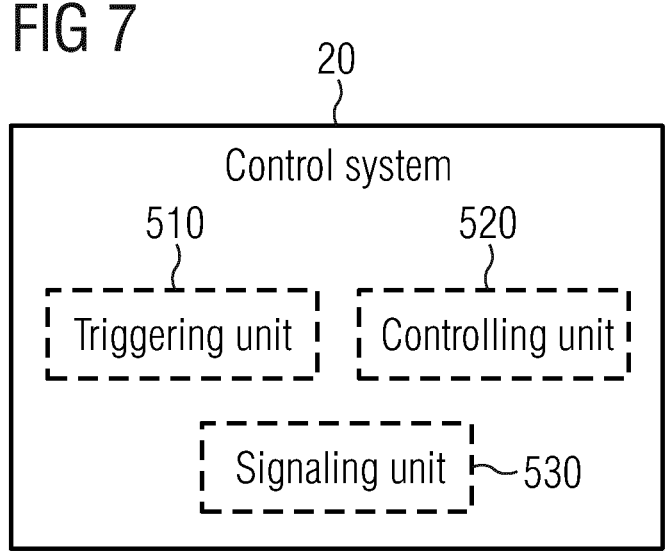
FIG. 7 is a block diagram of a control system according to other embodiments.

FIG. 7 illustrates a schematic block diagram of the control system 20 according to still other embodiments. As shown, the control system 20 implements various functional means, units, or modules, e.g., via the processing circuitry 410 in FIG. 6 and/or via software code. These functional means, units, or modules, e.g., for implementing the method 100 herein, include for instance a triggering unit 510 for, responsive to the occurrence of a condition for the transmission system to exit a sleep state, triggering the transmission system 12 to transition from the sleep state to an active state. Also included may be a controlling unit for controlling the transmission system 12 to transmit during at least a fraction of a transition period over which the transmission system 12 transitions from the sleep state to the active state. Some embodiments also include a signaling unit 530 for signaling that the transmission system 12 is transmitting or will transmit during the transition period, is transmitting or will transmit in compliance with relaxed component performance requirements, and/or is transmitting or will transmit with a reduced transmission rate. Alternatively or additionally, the signaling unit 530 may be for signaling a duration of the transition period and/or a transmission rate with which the transmission system is capable of transmitting during at least a fraction of the transition period.

Note also that the transmission system 12 herein may be implemented by any network node or equipment in the system 10. In some embodiments, the transmission system 12 is integrated with or co-located with the control system 20 (e.g., located in the same node or device as the control system 20). In other embodiments, the control system 20 is separated from or located away from the transmission system 12 (e.g., in a different radio network node than the transmission system 20). The transmission system 12 may perform the methods herein and any other processing by implementing any functional means, modules, units, or circuitry. In one embodiment, for example, the transmission system 12 comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
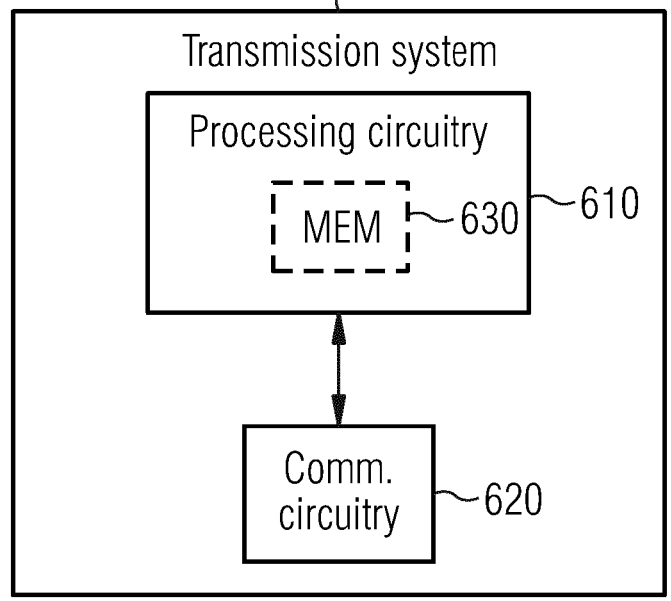
FIG. 8 is a block diagram of a transmission system according to some embodiments.

FIG. 8 for example illustrates the transmission system 12 in accordance with one or more embodiments. As shown, the transmission system 12 includes processing circuitry 610 and communication circuitry 620. The communication circuitry 620 (e.g., radio circuitry) is configured to transmit and/or receive information to and/or from one or more other nodes, e.g., via any communication technology. Such communication may occur via one or more antennas that are either internal or external to the transmission system 12. The processing circuitry 610 is configured to perform processing described above (e.g., in FIG. 4), such as by executing instructions stored in memory 630. The processing circuitry 610 in this regard may implement certain functional means, units, or modules.

Figure 9:
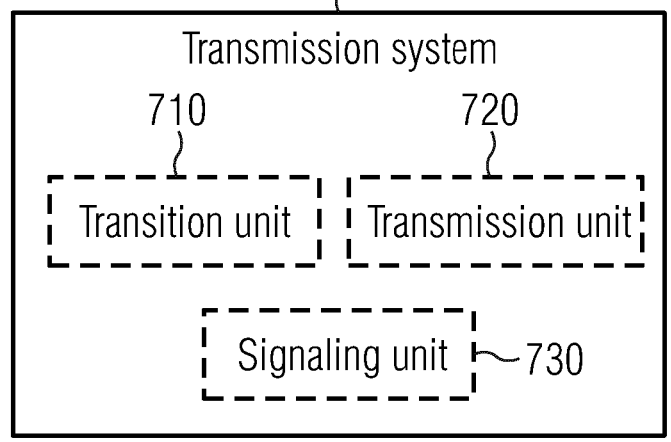
FIG. 9 is a block diagram of a transmission system according to other embodiments.

FIG. 9 illustrates a schematic block diagram of the transmission system 12 according to still other embodiments. As shown, the transmission system 12 implements various functional means, units, or modules, e.g., via the processing circuitry 610 in FIG. 8 and/or via software code. These functional means, units, or modules may include a transition unit 710 for transitioning the transmission system 12 from a sleep state to an active state, e.g., as triggered to do so by the control system 20. Also included may be a transmission unit 720 for transmitting during at least a fraction of a transition period over which the transmission system transitions from the sleep state to the active state, e.g., as controlled to do so by the control system 20. In some embodiments, the transmission system 12, e.g., for implementing the method 200 herein, may further include a signaling unit 730 for signaling that the transmission system 12 is transmitting or will transmit during the transition period, is transmitting or will transmit in compliance with relaxed component performance requirements, and/or is transmitting or will transmit with a reduced transmission rate. Alternatively or additionally, the signaling unit 730 may be for signaling a duration of the transition period and/or a transmission rate with which the transmission system is capable of transmitting during at least a fraction of the transition period.

Note further that a receiver 800 (e.g., receiver 14) herein may be implemented by any network node or equipment in the system 10. The receiver 800 may perform the methods herein and any other processing by implementing any functional means, modules, units, or circuitry. In one embodiment, for example, the receiver 800 comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10A:
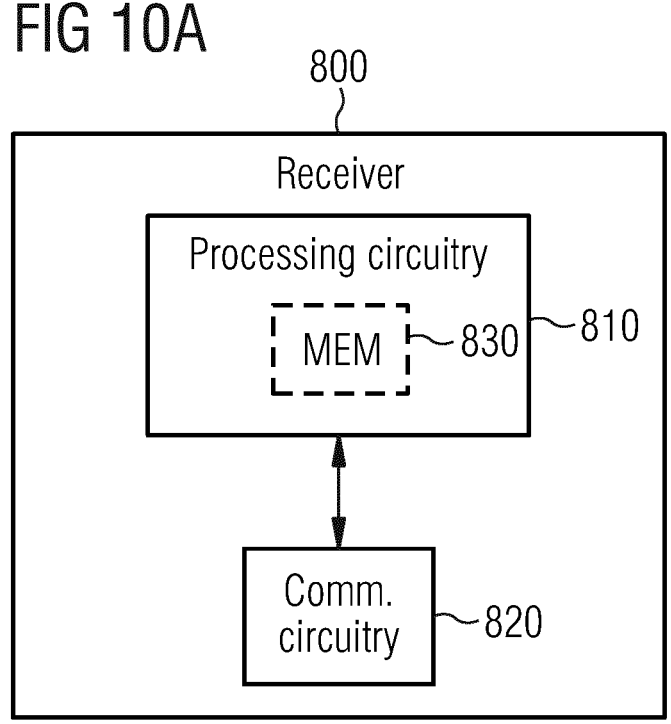
FIG. 10A is a block diagram of a receiver according to some embodiments.

FIG. 10A for example illustrates the receiver 800 in accordance with one or more embodiments. As shown, the receiver 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the receiver 800. The processing circuitry 810 is configured to perform processing described above (e.g., in FIG. 5), such as by executing instructions stored in memory 830. The processing circuitry 810 in this regard may implement certain functional means, units, or modules.

Figure 10B:
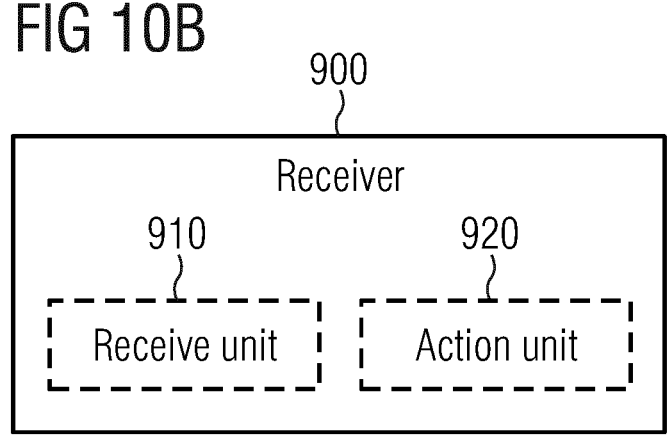
FIG. 10B is a block diagram of a receiver according to other embodiments.

FIG. 10B illustrates a schematic block diagram of a receiver 900 according to still other embodiments. As shown, the receiver 900 implements various functional means, units, or modules, e.g., via the processing circuitry 810 in FIG. 10A and/or via software code. These functional means, units, or modules may include a receive unit 910 for receiving a transmission from the transmission system 12 and/or for receiving signaling that the transmission system 12 is transmitting or will transmit during the transition period, is transmitting or will transmit in compliance with relaxed component performance requirements, and/or is transmitting or will transmit with a reduced transmission rate. Alternatively or additionally, the receive unit 910 may be for receiving signaling indicating a duration of the transition period and/or a transmission rate with which the transmission system is capable of transmitting during at least a fraction of the transition period. In some embodiments, the receiver 900 further includes an action unit 920 for performing one or more actions based on the received signaling (e.g., as described with respect to FIG. 5).

Those skilled in the art will also appreciate that embodiments herein further include corresponding computer programs.

A computer program comprises instructions which, when executed on at least one processor of a control system 20, transmission system 12, or receiver, cause the control system 20, transmission system 12, or receiver to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Embodiments further include a computer program product comprising program code portions for performing the steps of any of the embodiments herein when the computer program product is executed by a computing device. This computer program product may be stored on a computer readable recording medium.

Figure 11:
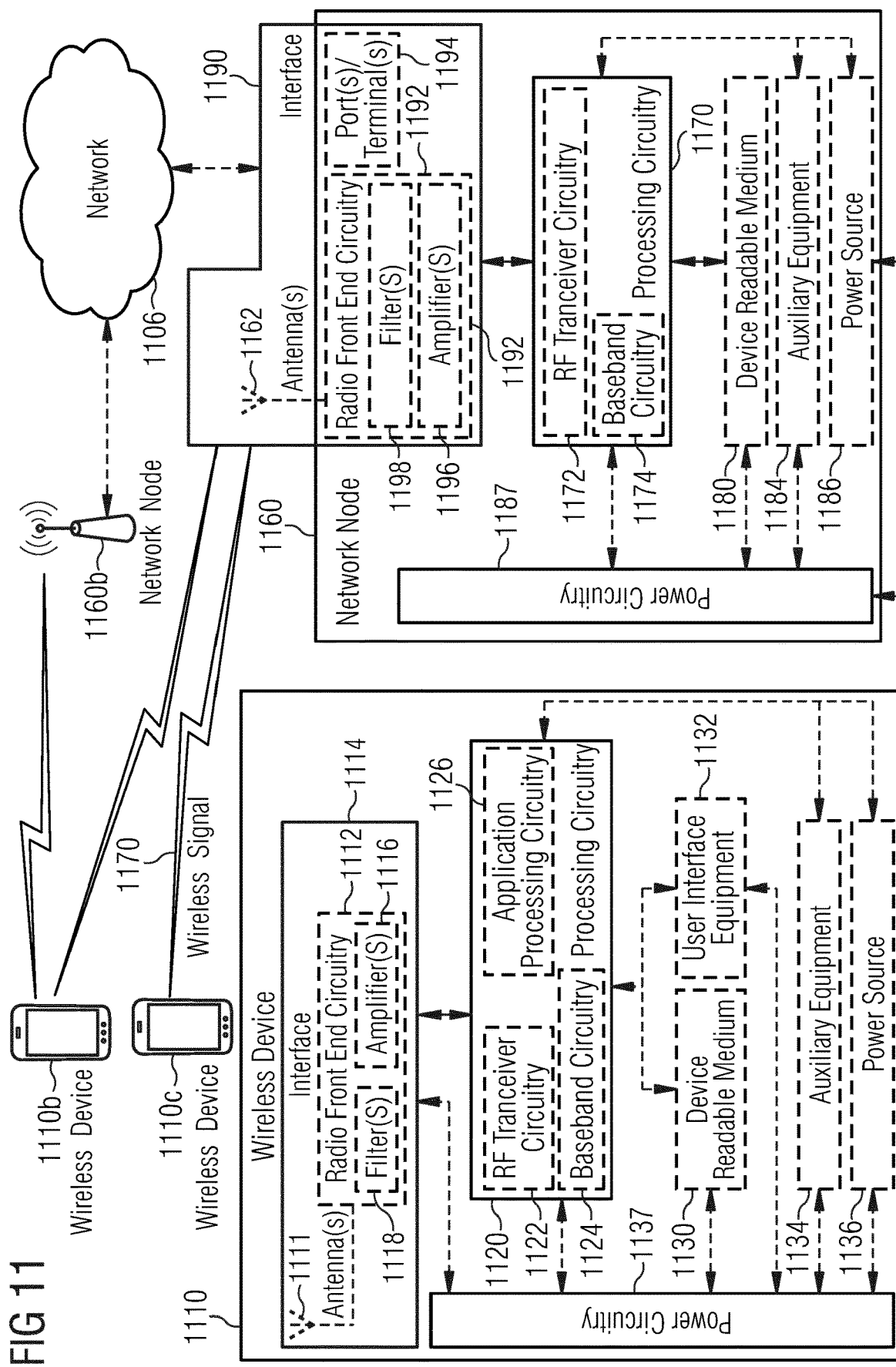
FIG. 11 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
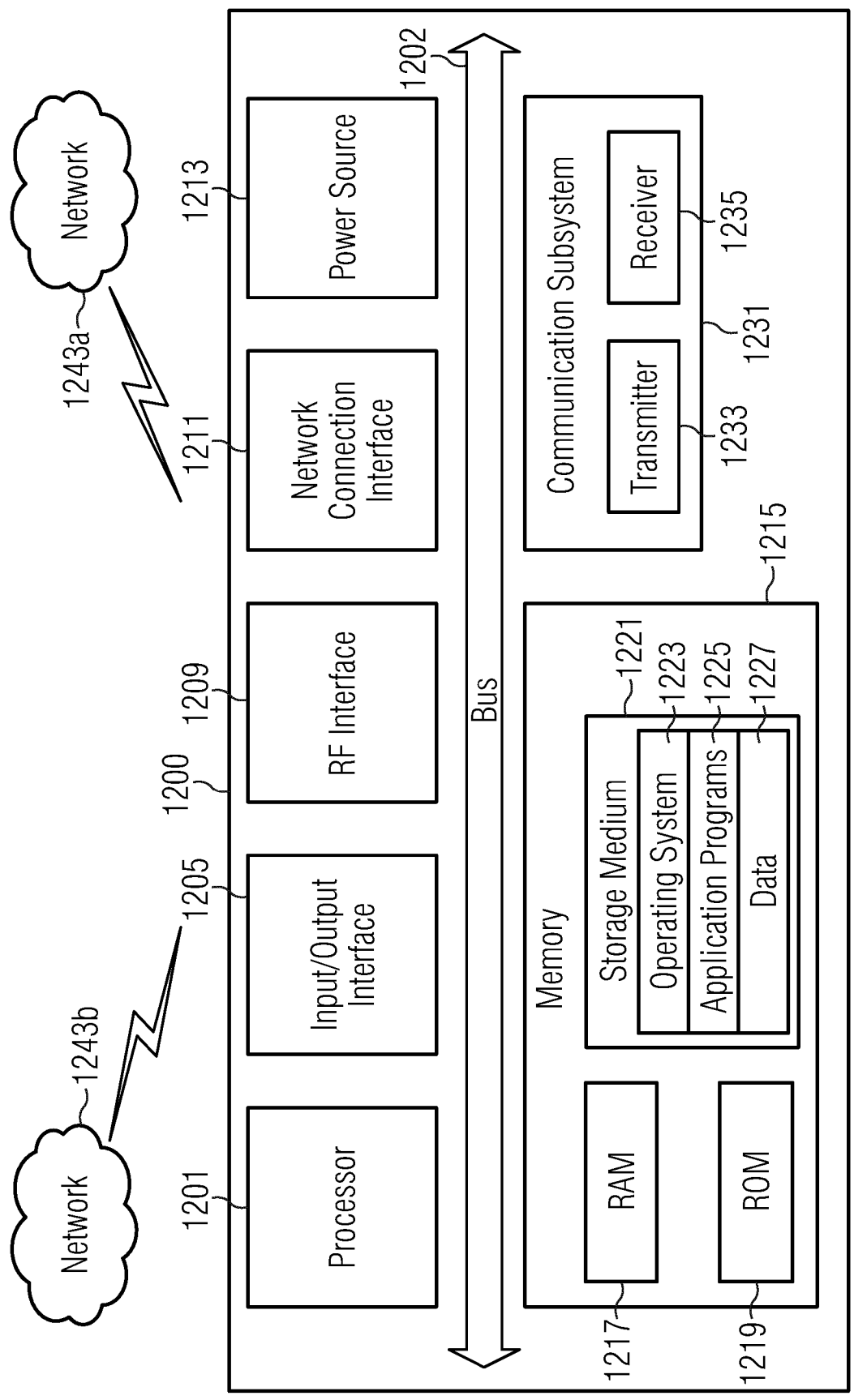
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
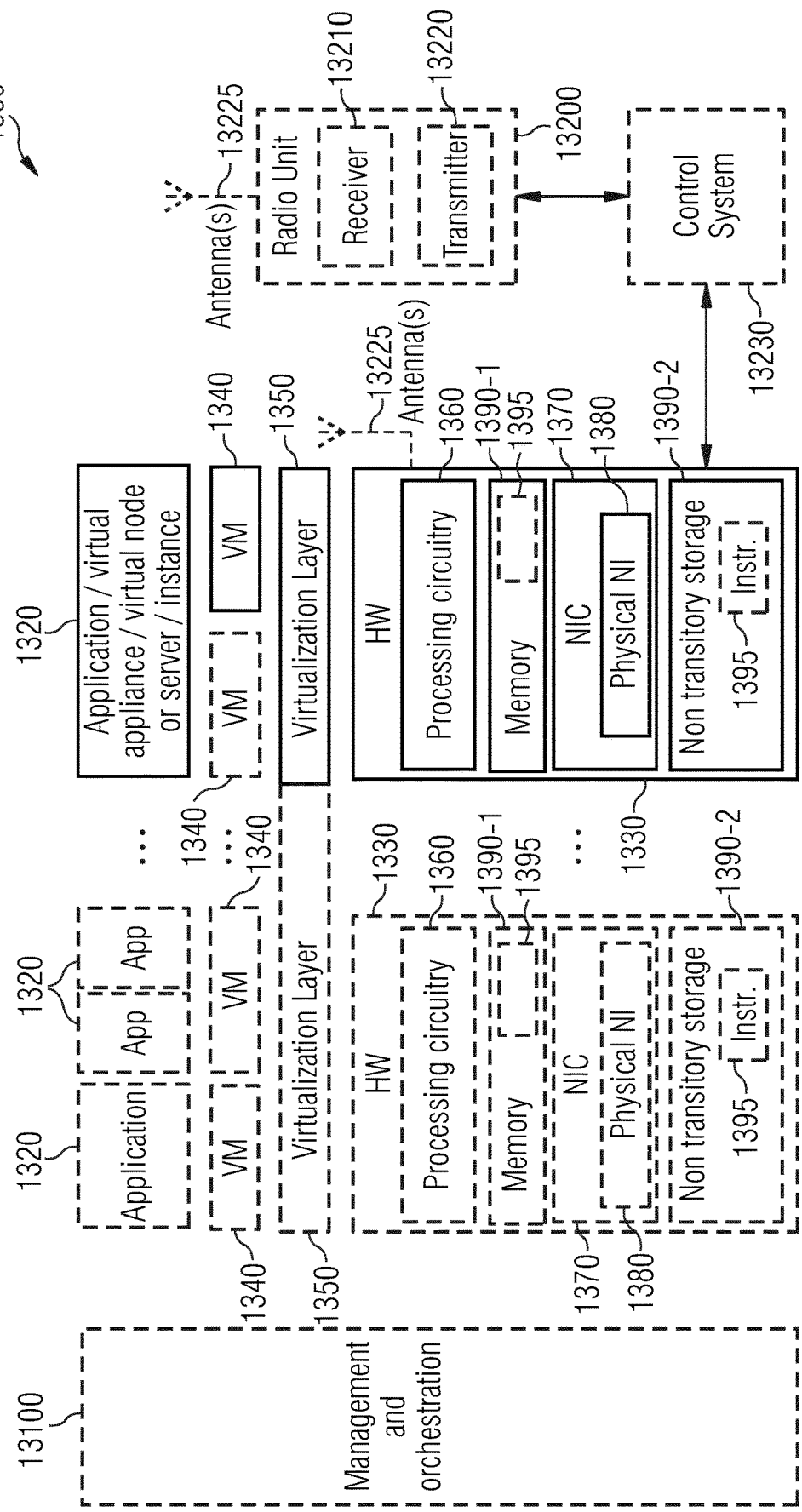
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
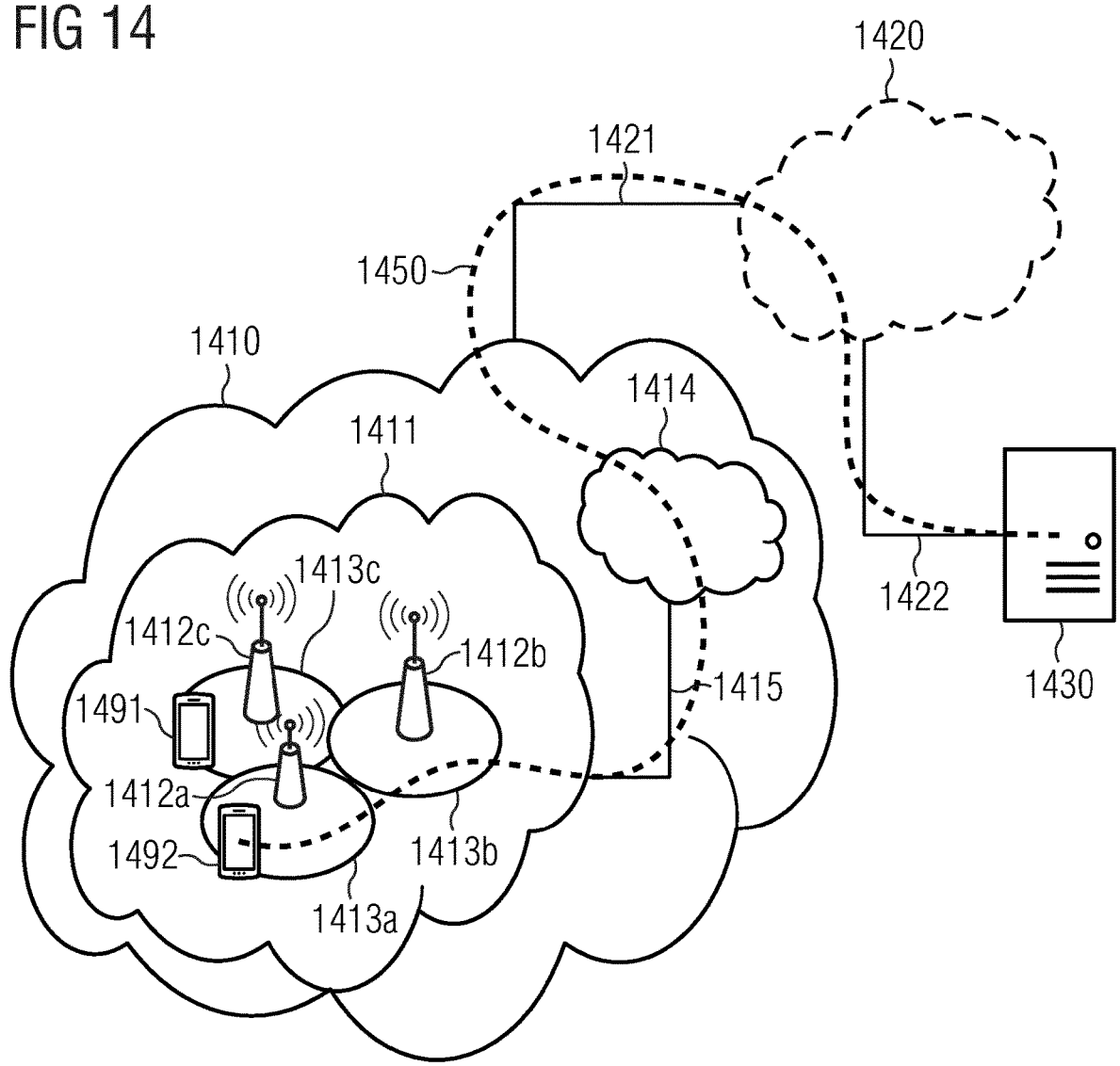
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
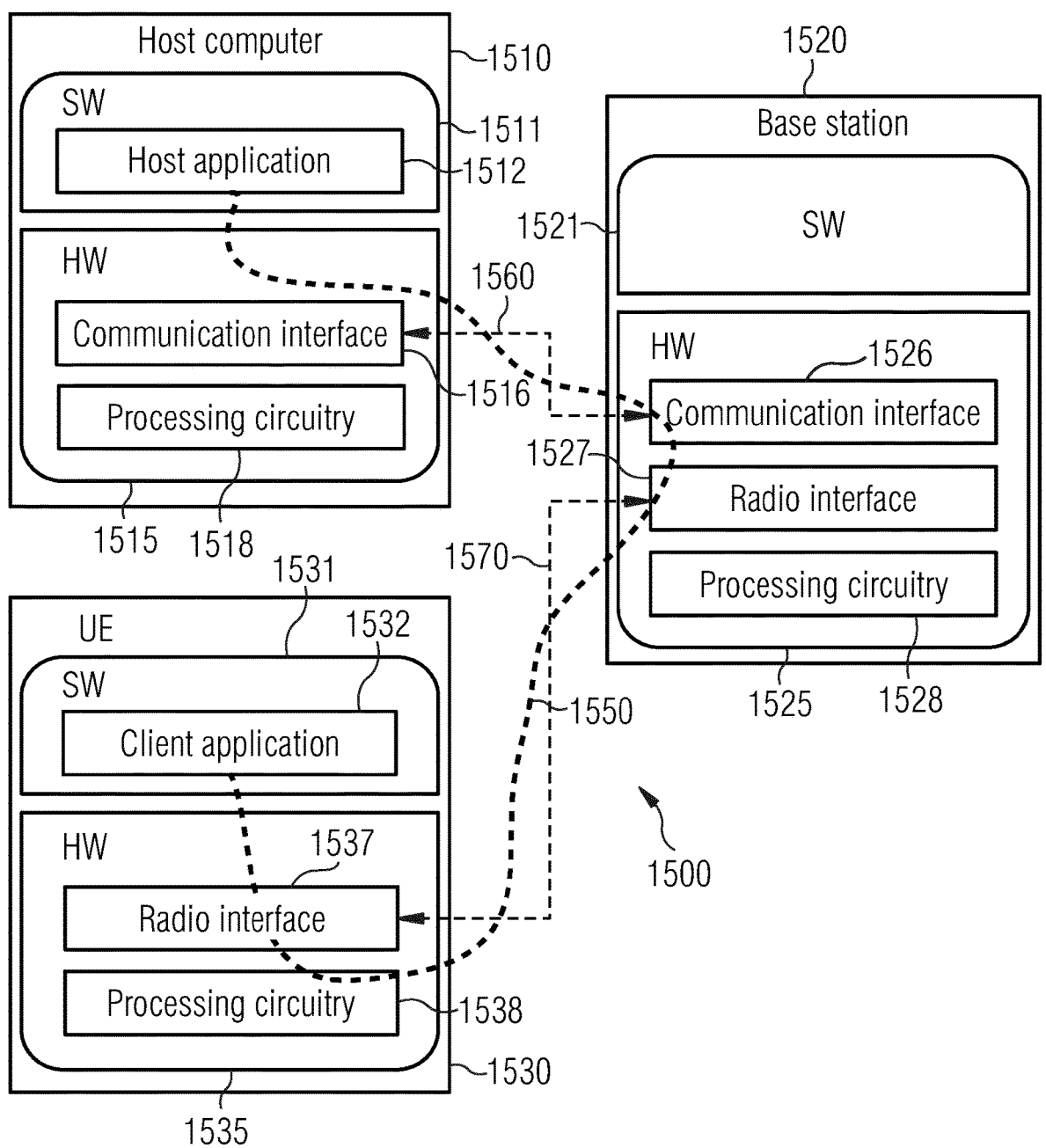
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the data latency and power consumption and thereby provide benefits such as reduced user waiting time, better responsiveness, and reduced environmental footprint.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
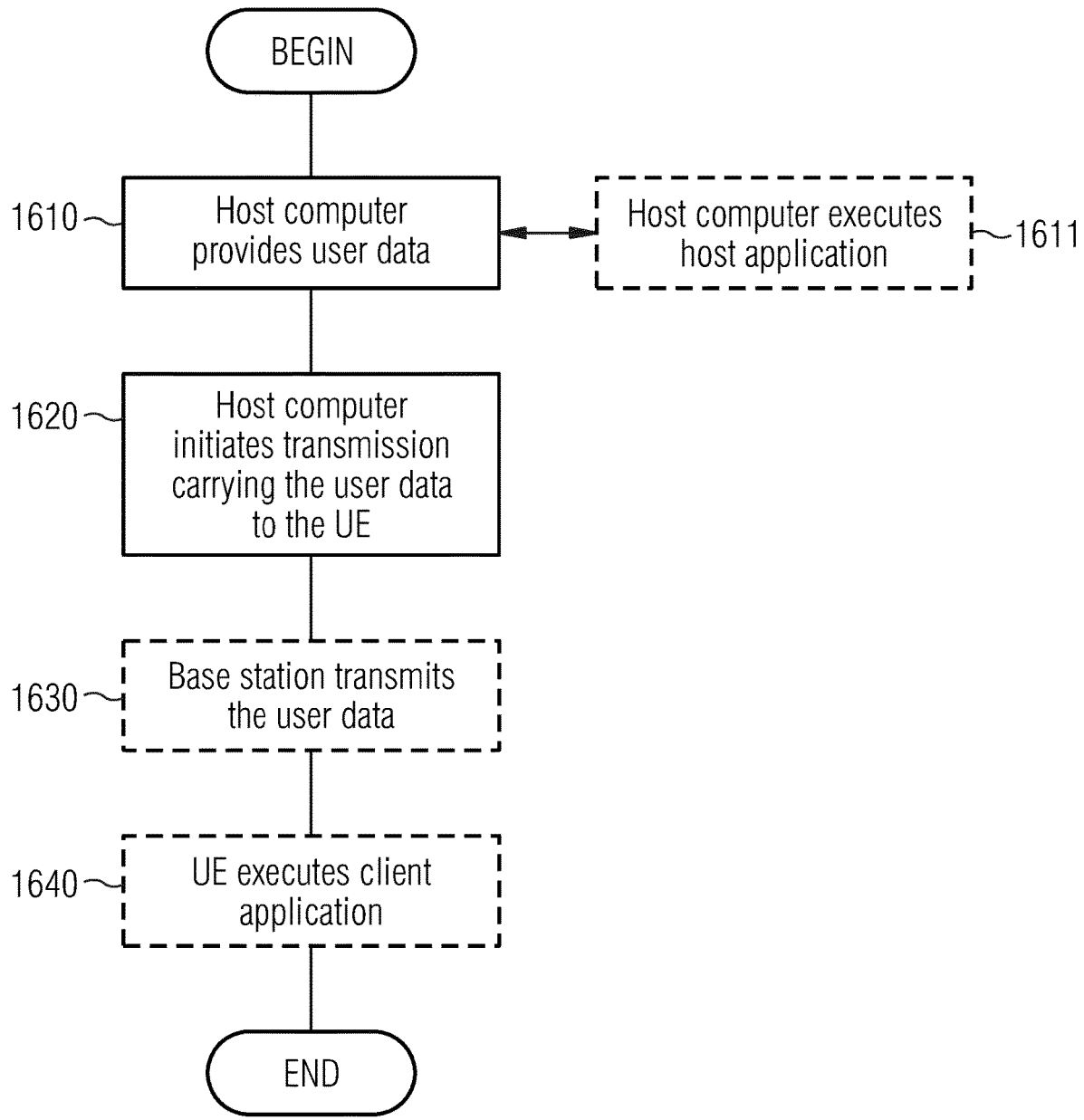
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
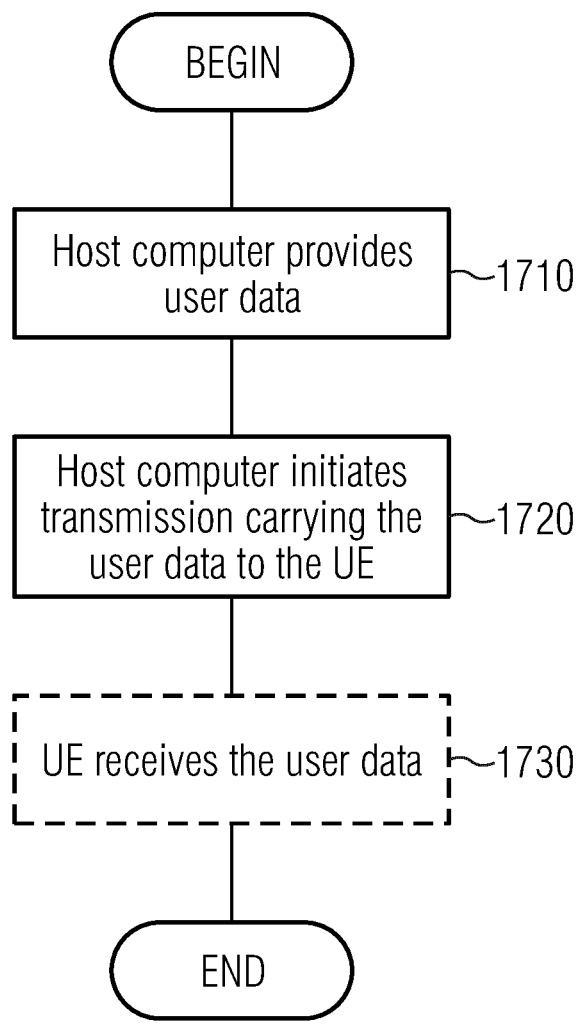
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
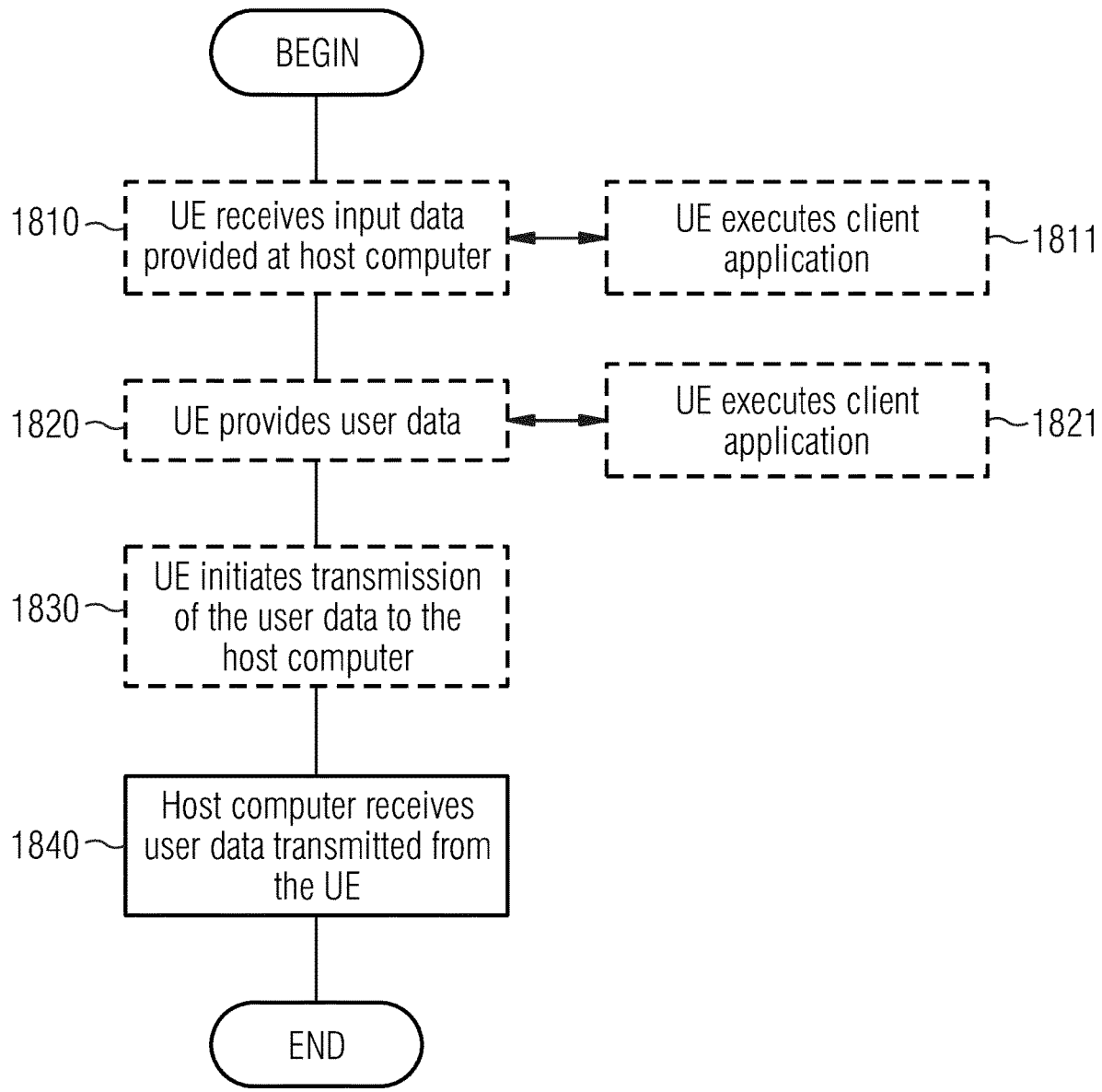
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method for controlling a transmission system, the method comprising:
   responsive to the occurrence of a condition for the transmission system to exit a sleep state in which certain transmission components of the transmission system are de-activated, triggering the transmission system to transition from the sleep state to an active state in which the certain transmission components are activated and comply with certain component performance requirements, the certain transmission components including an oscillator, the certain component performance requirements including a frequency error requirement of the oscillator;
   controlling the transmission system to transmit, during at least a fraction of a transition period over which the transmission system transitions from the sleep state to the active state, in compliance with relaxed component performance requirements that are reduced with respect to the certain component performance requirements, the relaxed component performance requirements including a relaxed frequency error requirement that permits the oscillator to have larger frequency error than the frequency error requirement, the controlling comprising controlling the transmission system to transmit, during at least a fraction of the transition period, with a reduced capability that is reduced compared to a corresponding capability with which the transmission system is capable of transmitting in the active state and the reduced capability comprising one or more of a reduced maximum modulation order, a reduced maximum channel coding rate, a reduced maximum number of transmission streams, a reduced maximum number of component carriers, or a reduced maximum number of served users; and
   signaling that the transmission system is: transmitting or will transmit during the transition period over which the transmission system transitions from the sleep state to the active state, transmitting or will transmit in compliance with relaxed component performance requirements, and transmitting or will transmit with a reduced transmission rate that is reduced compared to a transmission rate with which the transmission system is capable of transmitting in the active state.

2. The method of claim 1, wherein said controlling comprises controlling the transmission system to transmit, during at least a fraction of the transition period, up to a reduced maximum transmission rate that is reduced compared to a maximum transmission rate up to which the transmission system is capable of transmitting in the active state.

3. The method of claim 1, wherein the certain transmission components include one or more analog transmission components.

4. The method of claim 1, wherein the certain transmission components include a power amplifier, the certain component performance requirements include a linearity requirement of the power amplifier, and the relaxed component performance requirements include a relaxed linearity requirement that permits the power amplifier to be less linear than the linearity requirement.

5. The method of claim 1, further comprising signaling a duration of the transition period and/or a transmission rate with which the transmission system is capable of transmitting during at least a fraction of the transition period.

6. The method of claim 1, wherein the method is performed by a wireless device that includes the transmission system.

7. The method of claim 6, further comprising receiving multiple different uplink grants for use by the wireless device in transmitting at different respective transmission rates, and wherein said controlling comprises selecting from among the multiple different uplink grants the uplink grant that corresponds to a transmission rate with which the transmission system transmits during at least a fraction of the transmission period.

8. The method of claim 1, wherein the method is performed by a radio network node that includes the transmission system.

9. The method of claim 1, wherein the
transmission components comprise multiple distributed radio network nodes or multiple distributed antenna elements.

10. A control system for controlling a transmission system, the control system comprising:
memory, and
processing circuitry coupled to the memory, wherein the control system is configured to:
responsive to the occurrence of a condition for the transmission system to exit a sleep state in which certain transmission components of the transmission system are de-activated, trigger the transmission system to transition from the sleep state to an active state in which the certain transmission components are activated and comply with certain component performance requirements, the certain transmission components including an oscillator, the certain component performance requirements including a frequency error requirement of the oscillator;
control the transmission system to transmit, during at least a fraction of a transition period over which the transmission system transitions from the sleep state to the active state, in compliance with relaxed component performance requirements that are reduced with respect to the certain component performance requirements, the relaxed component performance requirements including a relaxed frequency error requirement that permits the oscillator to have larger frequency error than the frequency error requirement, the control system configured to control the transmission by performing a process that includes controlling the transmission system to transmit, during at least a fraction of the transition period, with a reduced capability that is reduced compared to a corresponding capability with which the transmission system is capable of transmitting in the active state and the reduced capability comprising one or more of a reduced maximum modulation order, a reduced maximum channel coding rate, a reduced maximum number of transmission streams, a reduced maximum number of component carriers, or a reduced maximum number of served users; and
signal that the transmission system is: transmitting or will transmit during the transition period over which the transmission system transitions from the sleep state to the active state, transmitting or will transmit in compliance with relaxed component performance requirements, and transmitting or will transmit with a reduced transmission rate that is reduced compared to a transmission rate with which the transmission system is capable of transmitting in the active state.

11. The control system of claim 10, wherein the control system is configured to control the transmission by performing a process that includes controlling the transmission system to transmit, during at least a fraction of the transition period, up to a reduced maximum transmission rate that is reduced compared to a maximum transmission rate up to which the transmission system is capable of transmitting in the active state.

12. The control system of claim 10, wherein the certain transmission components include one or more analog transmission components.

13. A computer program product comprising a non-transitory computer readable medium storing a computer program comprising instructions which, when executed by at least one processor of a control system, causes the control system to:
responsive to the occurrence of a condition for the transmission system to exit a sleep state in which certain transmission components of the transmission system are de-activated, trigger the transmission system to transition from the sleep state to an active state in which the certain transmission components are activated and comply with certain component performance requirements, the certain transmission components including an oscillator, the certain component performance requirements including a frequency error requirement of the oscillator;
control the transmission system to transmit, during at least a fraction of a transition period over which the transmission system transitions from the sleep state to the active state, in compliance with relaxed component performance requirements that are reduced with respect to the certain component performance requirements, the relaxed component performance requirements including a relaxed frequency error requirement that permits the oscillator to have larger frequency error than the frequency error requirement, the controlling comprising controlling the transmission system to transmit, during at least a fraction of the transition period, with a reduced capability that is reduced compared to a corresponding capability with which the transmission system is capable of transmitting in the active state and the reduced capability comprising one or more of a reduced maximum modulation order, a reduced maximum channel coding rate, a reduced maximum number of transmission streams, a reduced maximum number of component carriers, or a reduced maximum number of served users; and
signal that the transmission system is: transmitting or will transmit during the transition period over which the transmission system transitions from the sleep state to the active state, transmitting or will transmit in compliance with relaxed component performance requirements, and transmitting or will transmit with a reduced transmission rate that is reduced compared to a transmission rate with which the transmission system is capable of transmitting in the active state.

* * * * *